Figure 1:
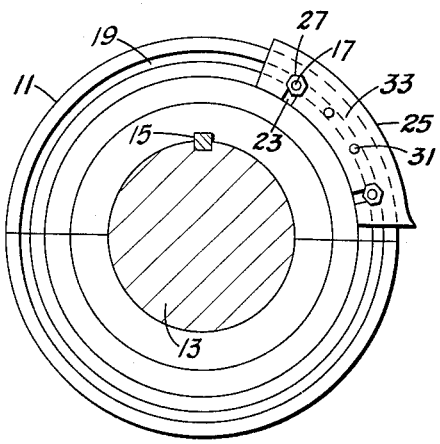

Feb. 22, 1966     D. W. YOUNG     3,236,137
CUTTING BLADE RETENTION MEANS
Filed May 13, 1964

INVENTOR.
DONALD W. YOUNG
BY David M. Bunnell
his Agent

United States Patent Office 3,236,137
Patented Feb. 22, 1966

3,236,137
CUTTING BLADE RETENTION MEANS
Donald W. Young, Rocks, Md., assignor to Koppers Company, Inc., a corporation of Delaware
Filed May 13, 1964, Ser. No. 367,022
3 Claims. (Cl. 83—671)

This invention relates generally to rotary cutting apparatus and, more particularly, to means for retaining the cutting blades on the slotting heads used in conjuction with box making machinery.

Box making machines conventionally cut slots in opposite sides of a rectangular board or sheet as it is passed through the machine to form the end closure flaps of the shipping container. In order to cut these slots, the machines contain pairs of coacting slotting heads mounted on rotating shafts. These rapidly rotating heads have cutting blades mounted on their peripheries which coact to cut slots in the board when the board is passed through the machine. Heretofore, the cutting blades have been secured to the cutting heads by passing screws through holes in the blades and threading the screws into the cutting head. Since it is necessary to quickly reset the cutting blades to a new position to accommodate different size blanks, this method of securing the blades has the disadvantage that the screws must be completely removed from the cutting head in order to disassemble or reset the cutting blades. The cutting blades have also been secured to the cutting head by screws slidably secured to an annular T-slot in the cutting head with their shanks projecting through a radial slot in the cutting blade with a nut threaded on the screw to frictionally secure the blade to the holder. Although the blades may be quickly removed or reset by loosening the nuts on the screws, the mounting is dangerous to personnel and to the machinery since the accidental loosening of the nuts due to vibration or the breaking of the cutting blade during operation will allow the centrifugal force being exerted on the blade by the rotation of the head to cause the blade to fly off the head.

An object of this invention, therefore, is to provide for the mounting of cutting blades upon a cutting head by an arrangement which eliminates the possibility of the blades accidentally flying off during operation and yet permits rapid resetting of the blades.

This invention contemplates a rotary cutting apparatus comprising a rotary cutting head having an annular groove in which bolts are slidably secured with their shanks extending outwardly from the groove through radial slots in one or more cutting blades. Nuts are threaded to the ends of the shanks in order to frictionally secure the blades to the head and the blades are provided with means attached thereto which project from the blades into the groove whereby the blades cannot fly off the head due to centrifugal force if the nuts loosen during operation.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

Figure 2:
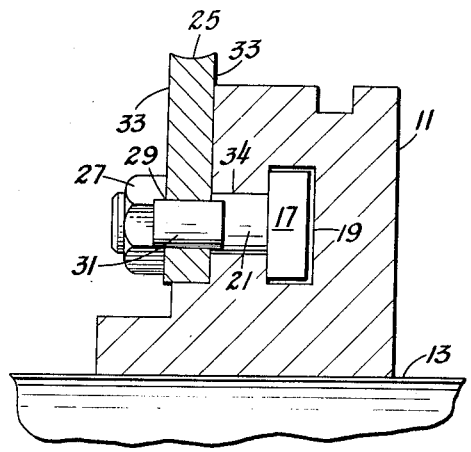

FIGURE 1 is an axial view of a rotary cutting head mounted on a rotatable shaft illustrating an embodiment of the novel cutting knife retention means, FIGURE 2 is a partial radial section of the embodiment illustrated in FIGURE 1, FIGURES 3, 4 and 5 illustrate alternate embodiments of the novel cutting knife retention means.

To prepare shipping containers from box blanks, the blanks are put through a slotter machine which performs the operation of cutting the blank at its edges to form the top and bottom flaps of the container. These blanks are usually made from stiff and relatively thick material such as corrugated paper. A stack of such blanks rest on a table at the front of the slotter machine and reciprocating feed members engage the trailing edge of each blank in turn and advance it into the bite of a pair of rollers which advance each blank through the machine.

In order to make slots in the leading and trailing edges of the blank, rotatable shafts carry three or more coacting sets of slotting heads. One head of each set is located above the path of travel of the blank and the other below it. One of each pair of heads has at least one cutting blade located on the periphery of the head and the other has a circumferential cutting groove located on its periphery of such dimension to receive the cutting blade. The heads are aligned so that when the head carrying the knife rotates to bring the knife into contact with the blank, the knife is received by the groove on the other head and a slot is cut in the blank. The blades are positioned on the heads so that they will come into cutting position at regular intervals to cut flaps of equal lengths at the forward and trailing edge of each blank in succession which is fed to the machine.

The blades are generally a unit separate from the head. The blades are usually segments having a radius larger than the head. The outer perimeter of the blade is sharpened to cut the blank. The inner perimeter is slotted in one or more places depending upon the blade length to accommodate the shank of a bolt which holds the blade to the head when a nut is threaded on the bolt.

When it is desired to slot blanks of a different length, the location of the cutting blades on the cutting heads is changed so that the cutting blades will be in a position to form slots at the correct places in the leading and trailing edges of the blank. A quick readjustment of the cutting blades to a new position is provided by the embodiment of the invention illustrated in FIGURE 1.

A key 15 secures cutting head 11 to driven shaft 13 so the head and shaft rotate together. The head 11 has a groove 19 in which T-bolts 17 are slidably secured. The shanks 21, FIGURE 2, of T-bolts 17 extend axially outwardly from the groove 19 and through radial slots 23 in blade 25. Nuts 27 threaded on T-bolts secure blade 25 by friction to cutting head 11.

A change in the position of blade 25 on the cutting head is readily made. Nuts 27 are loosened and blade 25 can be removed by moving it radially a sufficient amount so that shank 21 passes through the open end of slot 23. The blade can be repositioned at any location on head 11 simply by sliding the assembly along groove 19 and then retightening nuts 27 when the blade 25 is in the desired position. This novel mounting permits rapid adjustment and replacement of cutting blade 25, and yet prevents accidental movement of the blade. Should nuts 27 become loosened during operation, blades 25 will not fly off cutting head 11 even though the head is rotating at a high r.p.m. At this high rate of rotation the centrifugal force is so great that should the blade release from the head, it could either cause injury to operation personnel or severe damage to the machine but the novel cutting blade in accordance with this invention is not subject to such conditions because it includes auxiliary means for retaining the blade 25 on head 11.

According to this invention, blade 25 is provided with apertures 29 (FIGURE 2) in which pins 31 are securely fastened such as by welding or being pressed in place. Pin 31 projects from the face 33 of blade 25 so that the part of pin 31 projects into the same groove 19 that receives the shank 21 of bolt 17. Advantageously, the pin projects from both faces so that the blade position can be reversed if desired. Should nut 27 attached to shank 21 of T-bolt 17 become loosened during the rotation of shaft 13 and head 11, blade 25 will be retained on head 11 due to the fact that the portion of pin 31 which projects into groove 19 will contact the upper edge 34 of groove 19 which prevents centrifugal force from causing blade 25 to fly off cutting head 11. Thus, the slotting machine can be stopped and nut 27 retightened to again firmly secure cutting blade 25 to cutting head 11.

Figure 3:
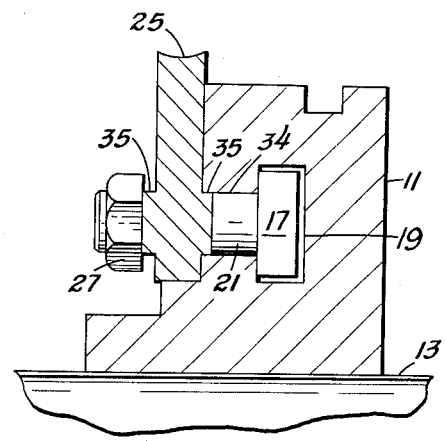

In the embodiment illustrated in FIGURE 3, cutting blade 25 is constructed so that it has annular shoulders 35 which are adapted to fit into groove 19 of cutting head 11 and contact edge 34 of groove 19 so that if nut 27 should become loose shoulder 35 on blade 25 will retain the blade on cutting head 11.

Figure 4:
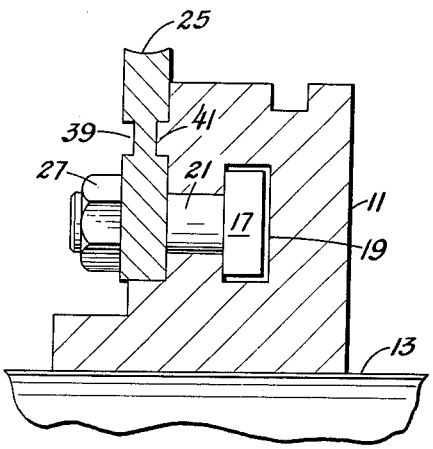

In the embodiment shown in FIGURE 4, cutting blade 25 is made with annular recesses 39 which are adapted to receive corresponding shoulder 41 on cutting head 11 to retain cutting blade 25 on cutting head 11 should nut 27 become loosened.

Figure 5:
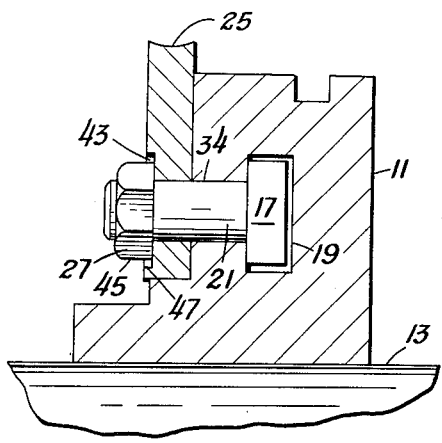

In still another alternate embodiment shown in FIGURE 5, cutting blade 25 is made with a counterbore 43 adapted to receive nut 27 so that should nut 27 become loosened blade 25 will be retained on cutting head 11 by means of contact between the edge 45 of nut 27 contacting edge 47 of recess 43 provided in blade 25.

In operation, one or more cutting heads 11 are secured to shaft 13 in proper position for cutting flaps in each blank which are of the desired lengths. The number of cutting blades required for the lengths of the slots to be cut in each blank are assembled to each cutting head by sliding blades 25 radially inward so that T-bolts 17 are received in slots 23. The nuts 27 are tightened on bolts 17 thus causing the pins or shoulders as the case may be to be received in the recesses provided therefor in cutting head 11. The pins or shoulders are of such dimension that the nuts need only be loosened and not removed in order to assemble the blades on the head. Should nuts 27 become loosened in operation, the pins or shoulders will prevent the cutting blade from flying off the tool holder. The result of the nuts 27 becoming loosened to the extent that the pins or shoulders will not retain the blade on the cutting head will become readily apparent before the event occurs from observation of imperfect cuts made in the blanks or by audible interference of the blade with the mating cutting slots so that the machine can be shut down and the nuts 27 retightened prior to injury to operating personnel or any damage to the machine occurring. Therefore, the invention provides a means for rapidly resetting the cutting blades on a cutting head without the danger of the cutting blades becoming detached from and flying off the cutting heads due to centrifugal force during the operation of the rotary cutting apparatus.

I claim:

1. A rotary cutting apparatus comprising a rotary cutting head, an annular groove in said head, a bolt adapted to be slidably secured in said groove and having a shank which is adapted to extend outwardly from said groove and that terminates in a threaded end, a cutting blade, a radial slot in said blade adapted to receive said shank, a nut for threading on the end of said bolt to frictionally secure said blade to said head, and at least two spaced pins attached to said blade and projecting therefrom to fit into said groove whereby said blade cannot fly off said head due to centrifugal force if said nut loosens during operation.

2. A blade for a rotary cutting apparatus wherein the blade is adapted to be secured to the cutting head by a bolt projecting from an annular groove in the cutting head and a nut holding the blade and cutting head together comprising: a segment having an outer periphery sharpened and adapted to cut a blank, a slot extending from the inner periphery of said segment toward the outer periphery for engagement with said bolt and a plurality of spaced apart pins projecting from said segment axially to engage the groove in said head whereby the projecting pin prevents centrifugal force from hurling said blade from said head if said nut becomes loosened during operation.

3. A blade for a rotary cutting apparatus wherein the blade is adapted to be secured to the cutting head by a bolt projecting from an annular groove in the cutting head and a nut holding the blade and cutting head together comprising: a segment having an outer periphery sharpened and adapted to cut a blank, and a slot extending from the inner periphery of said segment toward the outer periphery for engagement with said bolt, said slot in said segment having a counterbore adapted to receive said nut such that said nut will still prevent centrifugal force from hurling said blade from said head if said nut becomes loosened during operation.

References Cited by the Examiner

UNITED STATES PATENTS 1,837,235 12/1931 Schroeder et al. _____ 93—58.2
2,117,220 5/1938 Sieg _____ 83—671 X WILLIAM W. DYER, JR., *Primary Examiner.*

F. T. YOST, *Assistant Examiner.*